(12) United States Patent
Mann et al.

(10) Patent No.: US 6,963,590 B1
(45) Date of Patent: Nov. 8, 2005

(54) APPARATUS FOR DELIVERY OF MULTIPLE MEDIA DATA STREAMS, AND METHOD THEREFOR

(75) Inventors: Daniel Mann, Austin, TX (US); Andrew Cohen, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 869 days.

(21) Appl. No.: 09/879,256

(22) Filed: Jun. 11, 2001

(51) Int. Cl.[7] ................................................. H04J 3/04
(52) U.S. Cl. ..................... 370/535; 370/536; 370/537; 348/385.1; 348/423.1
(58) Field of Search ................................ 370/535, 536, 370/537, 538, 540, 542; 348/385.1, 423.1

(56) References Cited

U.S. PATENT DOCUMENTS

| | | | |
|---|---|---|---|
| 5,220,420 A | 6/1993 | Hoarty et al. | |
| 5,412,720 A | 5/1995 | Hoarty et al. | |
| 5,488,412 A | 1/1996 | Majeti et al. | |
| 5,541,638 A | 7/1996 | Story | |
| 5,617,331 A | 4/1997 | Wakai et al. | |
| 5,666,487 A | 9/1997 | Goodman et al. | |
| 5,742,680 A | 4/1998 | Wilson | |
| 5,754,771 A | 5/1998 | Epperson et al. | |
| 5,886,732 A | 3/1999 | Humpleman | |
| 5,973,722 A | 10/1999 | Wakai et al. | |
| 6,005,563 A | 12/1999 | White et al. | |
| 6,269,107 B1 * | 7/2001 | Jong ........................... | 370/535 |
| 6,741,617 B2 * | 5/2004 | Rosengren et al. ......... | 370/536 |

FOREIGN PATENT DOCUMENTS

| | | |
|---|---|---|
| GB | 2336276 | 10/1999 |
| WO | WO 98/11686 | 3/1998 |
| WO | WO 98/37648 | 8/1998 |
| WO | WO 00/36540 | 6/2000 |

OTHER PUBLICATIONS

"Satellite Express DTV–2035," *BroadLogic Network Technologies*, Sep. 21, 2000, 4 pages.

"Functional Model of a Conditional Access System," *EBU Technical Review*, EBU Project Group B/CA, Winter 1995, pp. 64–77.

* cited by examiner

*Primary Examiner*—Bob A. Phunkulh
(74) *Attorney, Agent, or Firm*—Winstead Sechrest & Minick P.C.

(57) ABSTRACT

An apparatus and method for integrating the delivery of data from a multiplicity of sources to a set of user electronic devices that present audio, video and digital information to the user is implemented. These devices may include conventional television displays, personal computers, and other conventional audio and video equipment. Information may be received from a multiplicity of sources which may include may include digital television via terrestrial or satellite broadcast, terrestrial analog radio, and digital data exchanged via a public network, such as the Internet. The mechanism of the present invention receives the multiplicity of data streams, processes them in accordance with each stream's formatting protocols (whether an analog stream, an MPEG Transport Stream, or TCP/IP stream, for example), including any conditional access protocols, and streams the processed data, in multiplexed transport stream to the user's presentation devices via a "fat" pipe, such as a FireWire™ bus. A thin client interface decodes the streamed data addressed to its corresponding presentation device.

26 Claims, 4 Drawing Sheets

APPARATUS FOR DELIVERY OF MULTIPLE MEDIA DATA STREAMS, AND METHOD THEREFOR

TECHNICAL FIELD

The present invention relates in general to data processing systems, and in particular, to a data processing system for the delivery of date it arrived from multiple media sources to one or more clients.

BACKGROUND INFORMATION

Modern consumers typically receive information and telecommunications through a multiplicity of communications channels from multiple providers. For example, entertainment and news via analog via radio and television broadcast which are captured via a conventional antenna and receiver system or delivered over a cable and telephone delivered via a "twisted pair" (often referred to as a plain old telephone system or POTS). Additionally, consumers are receiving digital telecommunications in the form of electronic mail or "e-mail" via a service provider connected to a public network such as the Internet, which may also deliver information of a wide variety upon request from the consumer, and provided by a myriad of information sources also connected to the network. This network of information providers and information consumers communicating via the Internet is commonly referred to as the World Wide Web ("WWW") The consumer's portal for digital data communications, such as might be communicated on the Internet might include an analog modem coupled to the POTS, a cable modem which may provide either unidirectional or bidirectional data transfer between a consumer's personal computer and an Internet gateway, or a digital subscriber line which provides higher bandwidth with digital communications over the same "twisted pair" that delivers telephone services to the consumer. Additionally, media, such as television and radio broadcast, that have traditionally been delivered in analog mode are increasingly being piped to the consumer in digital form, such as direct broadcast satellite television and radio.

Typically, these multiple data streams are delivered to the consumer via a corresponding interface which serves a single consumer appliance. Thus, for example, an individual personal computer may be connected to the Internet service provider (ISP) via an analog modem connected to a telephone line, which modem delivers digital data from the Internet to the personal computer. Television signals, either from a digital source such as direct broadcast satellite, or television from an analog source, such as terrestrial broadcast are received through their own corresponding portals, a conventional television receiver, or a satellite dish and satellite receiver, and delivered to the consumer via a "set-top box" converter and conventional television display. Alternatively, the audio/video media, such as television and radio, may be delivered through a cable television hookup via a set-top box that interfaces a conventional television receiver to the cable communications channel. Each conventional television receiver, or radio receiver must be equipped with its own set-top box that provides the interface between the conventional equipment and the delivery channel. Furthermore, certain of the entertainment services, particularly those delivered by other than terrestrial broadcast means, may provide services that require the consumer to pay additional subscription costs or other fees. These streams must be delivered in a secure form, and the interface, or set top-box, must also include conditional access mechanisms to limit the access to these services only to those consumers that are authorized to receive them. Thus, a consumer who wishes to use or receive these services on a conventional television, at for example, each of several locations is required to have a set top interface equipped with the necessary controlled access mechanisms in conjunction with each of the locations. In other words, the consumer of a multiplicity of entertainment and data streams received over a corresponding multiplicity of communication channels, must replicate the interfaces between the communication channels and the corresponding consumer hardware at each location within the consumer's locale at which the consumer wishes to use the data, or view and hear the entertainment, as appropriate. Furthermore, the interface equipment that must be replicated at each such location may embody a significant measure of technical sophistication, with a corresponding expense to the consumer. Thus, there is a need in the art for an apparatus and method to integrate the delivery of multiple information streams, which may include audio/video streams received in both digital and analog formats, and bidirectional digital data exchanged between a consumer's personal computers and a multiplicity of internetworked provider system and which may be delivered to the users locale via one or more, possibly distinct, digital communication channels.

SUMMARY OF THE INVENTION

The aforementioned needs are addressed by the present invention. Accordingly, there is provided, in a first form, a media server apparatus, the apparatus contains a plurality of demultiplexers. Each demultiplexer is operable for demultiplexing a data stream formatted in accordance with a first predetermined protocol. Each demultiplexer outputs a set of elementary streams each having a format in accordance with a second predetermined protocol. Additionally, a first one of the plurality of demultiplexers is operable for receiving the data stream from a first source, and a second one of the plurality operable for receiving the data stream from a second source. The apparatus also includes conditional access logic operable for receiving one or more controlled access data streams in the set of elementary streams. The conditional access logic outputs one or more descrambled data streams in response to corresponding ones of the controlled access data streams. A multiplexer is coupled to the plurality of demultiplexers. The multiplexer is operable for receiving one or more demultiplexed streams from each set of demultiplexed streams and the one or more descrambled data streams and outputs a multiplexed data stream having a format in accordance with a third predetermined protocol.

There is also provided, in a second form, a media server system. The system includes a plurality of demultiplexers each operable for demultiplexing a data stream formatted in accordance with a first predetermined protocol. Each demultiplexer outputs a set of demultiplexed streams each having a format in accordance with a second predetermined protocol, a first one of the plurality of demultiplexers is operable for receiving the data stream from a first source, and a second one of the plurality operable for receiving the data stream from a second source. First interface circuitry in the system is operable for receiving information signals from a plurality of sources and outputting the first and second data streams from the first source and the second source. The system further includes conditional access logic operable for receiving one or more controlled access streams in the set of demultiplexed streams. The conditional access logic outputs one or more descrambled data streams in response to corresponding ones of the controlled access data streams. A multiplexer is coupled to the plurality of demultiplexers. The multiplexer is operable for receiving one or more demultiplexed stream from each set of demultiplexed streams and the one or more descrambled data streams and outputs a multiplexed data stream having a format in accordance with a third predetermined protocol. A network encoder is operable for receiving the multiplexed data stream and outputs an output data stream encapsulated in accordance with a predetermined data-link-layer protocol.

There is also provided, in a third form, a media server method. The method includes receiving a plurality of media streams, one or more of which constitutes multiplexed data, and demultiplexing the one or more of the media streams comprising multiplexed data to form a plurality of elementary streams. The method also descrambles a first one of the plurality of elementary streams in response to controlled access information in the first one of the plurality of elementary streams, to form a descrambled stream, and multiplexes the descrambled stream and remaining ones of the elementary stream to form a transport stream.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
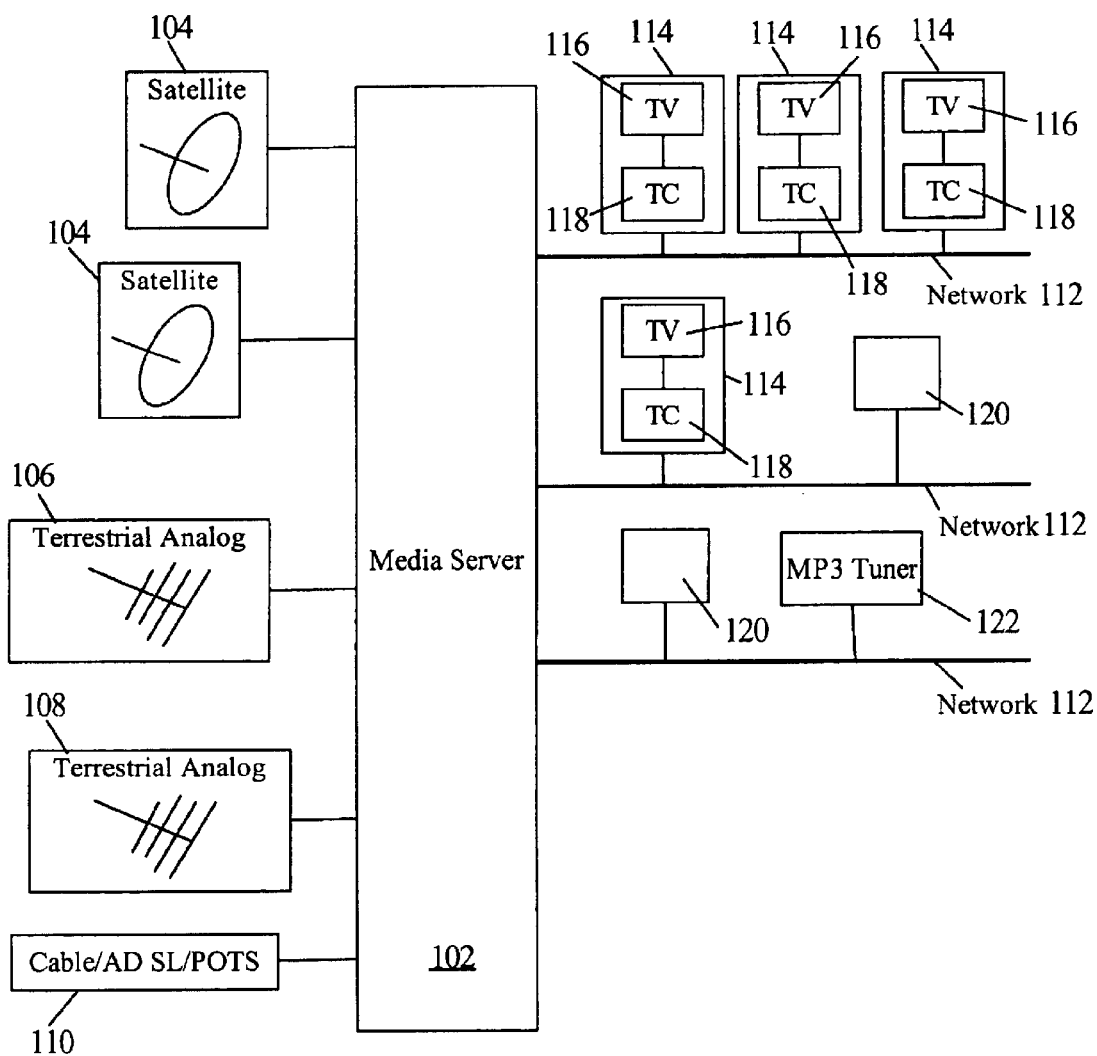
FIG. 1 illustrates, in block diagram form, a high level data distribution system in accordance with an embodiment of the present invention.

The present invention provides a mechanism for integrating the delivery of data from a multiplicity of sources to a set of user electronic devices that present audio, video and digital information to the user and which may generally be referred to as media presentation devices. These devices may include conventional television displays, personal computers, and other conventional audio and video equipment. The interface between the end user equipment and the integrated data distribution may be provided by a thin client that is enabled to decode Moving Picture Experts Group (MPEG) packets. The apparatus and method receive the data (or information, which is used synonymously with data herein) from a multiplicity of sources. These sources may include digital television via terrestrial or satellite broadcast, and terrestrial analog radio. These typically deliver entertainment streams but may generically deliver media streams the content of which is also informational or educational and will generically be referred to as audio/video streams. Additional sources of data include digital data exchanged via a public network, such as the Internet, and may include electronic mail, file transport, chat services, and World Wide Web ("WWW" or simply, "Web") services. The mechanism of the present invention receives the multiplicity of data streams, processes them in accordance with each stream protocol (whether an analog stream, an MPEG Transport Stream, or TCP/IP stream, for example), including any conditional access protocols, and streams the processed data to the clients via a "fat" pipe. In this way, each of the end user devices, in conjunction with its associated thin client, "picks off" the information the user of device has selected.

In the following description, numerous specific details are set forth such as specific word or byte lengths, etc. to provide a thorough understanding of the present invention. However, it will be obvious to those skilled in the art that the present invention might be practiced without such a specific detail. In other instances, well-known circuits have been shown in block diagram form in order not to obscure the present invention in unnecessary detail. For the most part, detail concerning timing considerations and the like have been omitted inasmuch as such details are not necessary to obtain a complete understanding of the present invention and within the skills of persons of ordinary skill in the relevant art.

Refer now to the drawings wherein depicted elements are not necessarily shown to scale and wherein like are similar elements are designated by the same reference numeral to the several fuse.

Referring first to FIG. 1, there is illustrated therein a high level block diagram depicting a media server system 100 in accordance with the principles of the present invention. A plurality of sources of information streams are coupled to a corresponding input of media server 102. These may include direct digital satellite broadcast streams 104 carrying audio/video information for viewing on conventional television equipment or audio information for reproduction on conventional audio equipment, radio and television via terrestrial analog sources 106, terrestrial digital television sources 108, and digital data via cable/digital subscriber line/plain old telephone services (POTS) 10. Media server 102 processes the input streams in accordance with the corresponding formatting and transmission protocols, including any conditional access protocols that maybe embodied in the information streams, and outputs the process data on one or more networks 112. The processed data may be encapsulated in MPEG-2 packets (which may be delivered in an MPEG Transport Stream) and streamed to one or more media presentation devices coupled to networks 112. Media presentation devices 114 include conventional television receivers 116 interfaced to network 112 via a corresponding thin client 118 which is enabled, for example, to decode MPEG-2 packets. (An artisan of ordinary skill would understand MPEG-2 to be a generic method for the compressed representation of video and audio data using a standardized coding syntax defined in the International Standards Organization (ISO) specification ISO 13818, which is hereby incorporated herein by reference.) The data is transported in packetized form. MPEG-2 supports multiprotocol encapsulation whereby data packetized for transport via other transport protocols, TCP/IP for example, may be transported in an MPEG-2 stream.) Network 112 may be a network having an architecture in accordance with the IEEE 1394-1995 Specification. (Such a network will hereinafter be referred to as an "IEEE-1394" network. An IEEE-1394 network may also be referred to in the art as FireWire™, which is a trademark of Apple Computer, Inc.) IEEE-1394 is a serial bus, and supports both isochronous transport and asynchronous transport. Nodes on the bus are addressable, and the data transfer is packetized. (Details of the IEEE-1394™ specifications, including the physical layer and link layer protocols may be found in the IEEE Standard 1394–1995, Copyright, Institute of Electrical and Electronic Engineers (IEEE), which is hereby incorporated herein by reference.) Other network architectures may also be used in network 112. For example, a 100BaseT network, also referred as Fast Ethernet may be used in an alternative embodiment of the present invention. (The specifications for Fast Ethernet may be found in EEE standard 802.3, Copyright IEEE, which is hereby incorporated herein by reference.)

Additionally, thin client interfaces 118 include data transceivers appropriate for the corresponding architecture of network 112. Thus, in an embodiment in which network 112 is a IEEE-1394 bus, thin client interfaces 118 may include a IEEE-1394 transceiver. This may be a commercially available integrated circuit product. (One such device which may be used in an embodiment of the present invention is the TSB43AA22 IEEE 1394-1395, 1394a Serial Layer Controller, by Texas Instruments Incorporated, Dallas, Tex.) Other media presentation devices in system 100 include a plurality of personal computers 120 coupled to network 112, and an MP3 tuner 122 (MP3 refers to MPEG-I audio layer III audio format). MP3 tuner 122 decodes MPEG packets encoded in accordance with MPEG-I audio layer III audio format, and provides an analog audio output. It would be understood by an artisan of ordinary skill, that MP3 player 122 may be used in conjunction with conventional analog audio reproduction equipment. It would be further understood that the media devices shown in FIG. 1 are for purposes of illustration only, and that alternative embodiments of system 100 in accordance with the principles of the present invention may include different numbers of video display units 114, personal computers 120, MP3 tuners 122, within any "fan-out" limitations imposed by the particular architecture of network 112 used in the embodiment. Client interfaces 118, PC 120 and MP3 tuner 122 may, for the purposes herein, be generically referred to as clients.)

Figure 2:
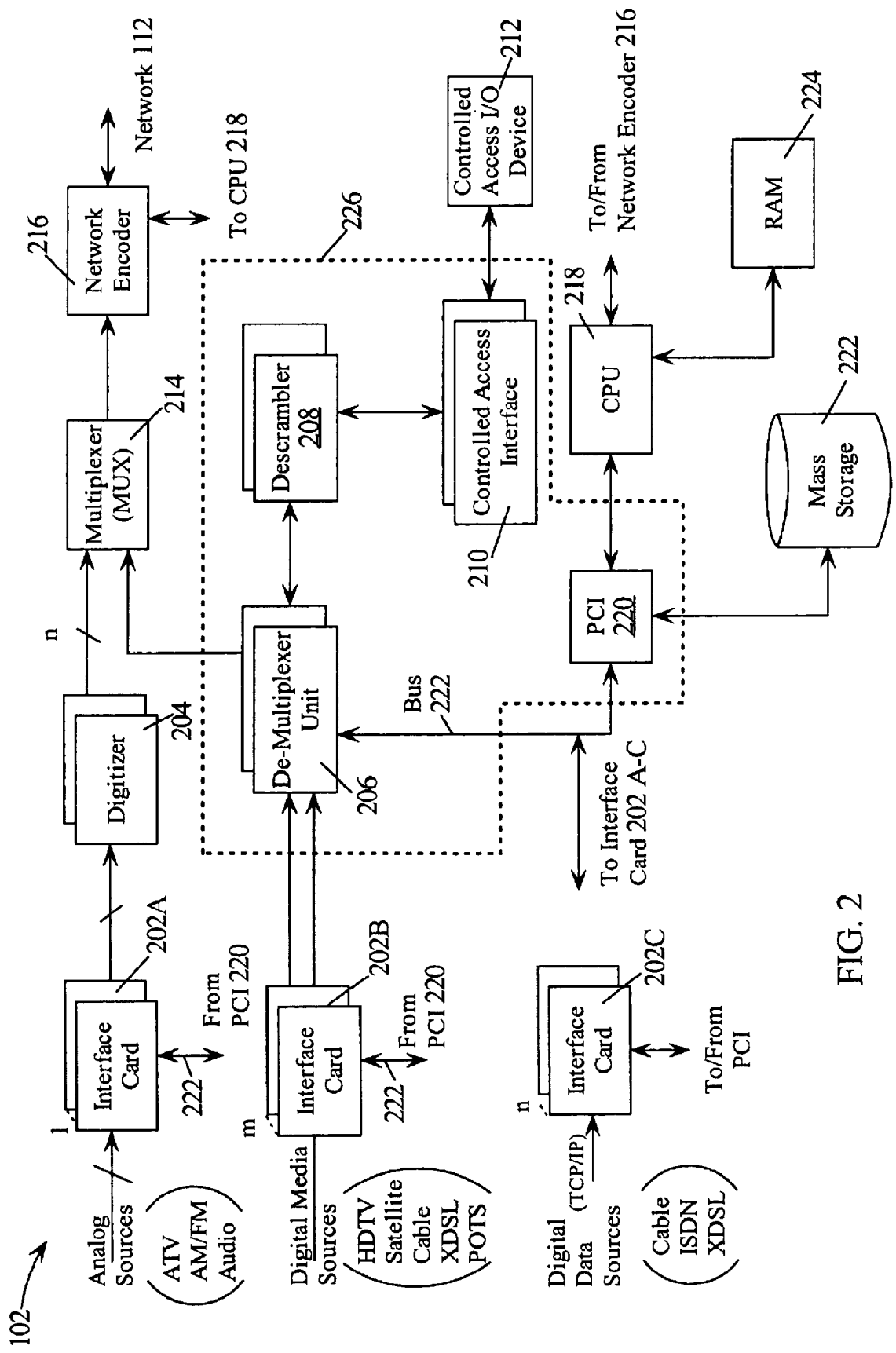
FIG. 2 illustrates, in block diagram form, a media server apparatus in accordance with an embodiment of the present invention.

The principles of the present invention may be further understood by referring now to FIG. 2 illustrating media server 102 in further detail. As discussed in conjunction with FIG. 1, data may be received from a plurality of sources. The communication channel carrying each information source is provided to the remaining portions of media server 102 via a corresponding interface card, one of a plurality of interface cards 202A–202C. Each one of interface cards 202A–202C includes circuitry for demodulating the communication carrier linking media server 102 to the sources of the data. Thus, interface cards 202A which interface analog sources, such as terrestrial analog TV and terrestrial analog broadcast radio may include circuitry for processing the analog signals coupled from a receiving antenna. As would be understood by an artisan of ordinary skill, this circuitry might include radio frequency (RF) amplifiers, frequency conversion circuitry, intermediate frequency (IF) amplification circuitry, and detectors or demodulators for extracting the baseband signals from the communication carrier. Similar circuitry may also be included in the corresponding one of interface cards 202B for interfacing a digital media source carried by direct satellite broadcast. Other interface cards 202B may include circuitry for receiving high definition television (HDTV), digital media sources carried via cable modem, which data may also be encoded in accordance with the MPEG-2 standard. Likewise, if another one of interface cards 202B may contain circuitry for receiving digital media data, which may also be encoded in accordance with the MPEG-2 standard, via a digital subscriber line (xDSL), such as an asymmetric digital subscriber line (ADSL).

Analog data, extracted from the communications carrier via the corresponding ones of interface cards 202A are digitized in digitizer 204. The output of digitizer 204 may be an n-bit digital signal. That is digitizer 204 outputs a sequence of n-bit digital values at a predetermined sampling rate of the digitizer. For example, a digital signal corresponding to the Phase Alternation Line (PAL) video formal may be an eight bit quantization with a sampling rate of 35.48 MHz. Alternatively such an digital signal may have ten bit values. These are exemplary embodiments of signals output by the digitizer, and it would be recognized by those of ordinary skill that other embodiments having different numbers of bits or other bit rates, or both would be within the spirit and scope of the present invention. The digital signals will be streamed to the media devices on the network, such as network 112, FIG. 1, as described further hereinbelow.

Digital data derived from a digital media source, such as direct broadcast satellite television, HDTV, or public network such as the Internet, provided by corresponding interface card 202B to the multiplexer unit 206. The digital data may be in packetized form and encapsulated in accordance with a protocol that depends on the source medium. Thus, digital data such as electronic mail (e-mail) downloaded files, chat services, or web pages, which may be encapsulated in accordance with the Transport Control Protocol/Internet Protocol (TCP/IP). (The TCP/IP protocol suite commonly used on the interconnected collection of networks referred to as the Internet. The specifications for the protocols that constitute the TCP/IP protocol suite are defined in a set of documents, each of which is referred to as a Request For Comments (RFC). (The transport control protocol (TCP) and the Internet protocol (IP) themselves are defined in RFC 793 and RFC 791, respectively. Other protocols in the suite define protocols for file transport (FTP), for remote terminal connection (TELNET) and other services, as would be recognized by artisans of ordinary skill in the networking art.) Additionally, digital media data, digital data representing audio visual content, which typically is derived from wide bandwidth sources, maybe encapsulated in accordance with MPEG-2 protocols. Furthermore, MPEG packetized elementary streams (PES) from individual sources of audio/video information, or content, may be multiplexed into an MPEG Transport Stream which is delivered via a wide band communications channel, such as direct broadcast satellite. The corresponding interface cards which maybe one or more interface cards 202B, for example, deliver the MPEG Transport Stream to the multiplexer unit 206. Multiplexer unit 206 may include one or more of the multiplexers and associated switching circuitry, as discussed further hereinbelow with FIG. 3. Additionally, the MPEG Transport Stream may include one or more PES that have been scrambled to restrict access to the content. Such PES include conditional access (CA) packets contain that entitlement information that is used to descramble the PES. The entitlement information enables a user to access the content which the user has subscribed or otherwise purchard.

The multiplexed, scrambled PES is descrambled by descramblers 208. Media server 102 may include a plurality of descramblers 208. This may permit server 102 to support a plurality of scrambling methodologies that are being used in the digital media art. Descramblers 208 descramble the PES in response to authentication information received from controlled access interfaces 210. For example, a corresponding one of descramblers 208 may receive a decryption key via interface 210 in accordance with a CA methodology that scrambles the PES by encrypting the content prior to its MPEG encoding. Additionally, a user may have purchased or otherwise acquired access, to a CA channel for a limited period of time. User information, such as users specific decryption keys, and other information required to access a CA channel may be contained in a machine readable device such as a "smart card." (A smart card is a token, similar in size to a credit card, that includes microprocessor and memory circuits for authenticating a user of CA information.) The decryption key may be generated by hardware in the smart card in response to information stored in the card in combination with entitlement in the CA packets. In this way, access may be denied on expiry of a users subscription. Communication between controlled access interface 210 and the smart card, or similar device, may be mediated by controlled access I/O reader 212. The descrambled PES is returned the multiplexer unit 206. Switching logic (not shown in FIG. 2) within the demultiplexer unit 206 transfer the PES to multiplexer 214. Additionally, demultiplexer unit 206 may transfer clear PESs, as well as TCP/IP packets received from corresponding interface cards 202B to multiplexer 214. Digital data received in the TCP/IP domain, for example, from a source on the Internet via one of interface cards 202C, maybe incorporated into a MPEG Transport Stream in MUX 214 by encapsulating the TCP/IP packets in accordance with the MPEG-2 multiprotocol encapsulation to generate a corresponding PES, and multiplexing the resulting PES into the Transport Stream. Multiplexer 214 also receives the digitized output from digitizer 204, which digitized output represents the information received from analog sources, as previously discussed. Multiplexer 214 encapsulates the digital data received from digitizer 204 in accordance with MPEG-2 protocols, and multiplexes the PESs into an MPEG Transport Stream which is provided to network encoder 216. Each client, such as each of client interface, 118, C120 and MP3 tuner 122 FIG. 1, has an "address" for routing of the packets encapsulated in the MPEG-2 stream. A header table incorporated in the MPEG Transport Stream associates the data packets corresponding to a particular content stream with an identifier of the content itself. Using the header table, a client can extract a pointer to the content stream requested by the client in accordance with command and control signals sent to the media server, as discussed below.

Network encoder 216 encapsulates the MPEG packets in accordance with the link layer and physical layer protocols for the corresponding network architecture, and transmits the data on network 112. Thus, for example, in an embodiment in which network 112 employs the IEEE-1394 architecture, network encoder 216 may include an IEEE-1394 transceiver, which may also be a commercially available device, as previously discussed. Similarly, in an embodiment of the present invention in which network 112 uses the Fast Ethernet architecture, network encoder 216 may incorporate a transceiver in accordance with the IEEE 802.3 standard.

Additionally, clients (not shown in FIG. 2) coupled to network 112 may send, command and control information to server 102 via network 112. Such command and control information is decoded by network encoder 216, for example, by the receiver portion in a transceiver corresponding to the network architecture in the particular embodiment of network 112, and provided to CPU 218. (CPU 218 may be a commercially available microprocessor, such as an AMD K7 microprocessor, or a CPU of a comparable class.)

In response to the command and control information received via network encoder 216 from the media devices attached thereto, CPU 218 provides control signals to demultiplexer unit 206 via Peripheral Component Interconnect (PCI) interface 220. PCI interface 220 communicates control information and data between demultiplexer unit 206 and CPU 218 via PCI bus 222. (The PCI bus is a bus architecture in accordance with the PCI Local Bus Specification, Copyright 1992, 1993, 1995 PCI Special Interest Group, which is hereby incorporated herein by reference.) The control signals generated by CPU 218 and communicated to demultiplexer unit 206 via PCI Interface 220, are generated in response to command and control information received from media devices coupled to network 112. The command and control signals may be sent from the media devices (not shown in FIG. 2) via network 112 in accordance with the Digital Storage Media Command and Control (DSM-CC) specification. The DSM-CC are a standardized set of protocols which provide control functions and operations for managing MPEG-2 packet streams. The command and control information received from the media devices are used to control the addressing of packets in the MPEG Transport Stream communicated on network 112 as previously described. For example, a tuning command may be returned by a client (such as one of client interface 118, PC 120 or MP3 tuner 122, FIG. 1). This command may assert the demultiplexer unit, such as demultiplexer unit 206, at a high level via CPU software stack applications program interfaces (API). In this way, the CPU, such as CPU 218, controlling demultiplexer unit via PCI bus 222, may extract from the MPEG Transport Stream the program content selected by the client. (Note that the resulting PES may be further processed, for example to effect CA entitlement, as discussed hereinbelow, before being streamed to the client.)

Additionally, in response to the command and control signals, CPU 218 may, via PCI Interface 220 send control signals to interface cards 202A–C. In this way, a media device attached to network 112, such as an audio reproduction system may, for example, tune an analog AM or FM radio broadcast signal by controlling a digital synthesizer in the corresponding one of interface cards 202A. For example, the baseband audio may be demodulated from the analog broadcast signal and digitized (which may use the CD-DA standard with a sampling rate of 44.1 kHz and sixteen-bit quantization, however, other digital formats maybe used and would be within the spirit and scope of the present invention). The digital information may then be sent in TCP/IP packets to the requesting client address. These examples are illustrative, and other control signals provided to interface cards would be recognized by ordinarily skilled artisans to be within the spirit and scope of the present invention.

Additionally, in response to control signals received from CPU 218, demultiplexer unit 206 may send a demultiplexed (and descrambled, if appropriate) PES to mass storage unit 223 via PCI Interface 220. The PES stored on mass storage unit 223 may then be recovered at a later time, in response to further control signals, and transmitted via PCI interface 220 to demultiplexer unit 206, and then via demultiplexer unit 206 to multiplexer 214, wherein it may be multiplexed into the MPEG Transport Stream and communicated to the corresponding media unit via network 112, as previously discussed. In this way media server 102 may also function as a digital "VCR".

CPU 218 also receives digital data sent upstream from media devices (not shown in FIG. 2) coupled to network 112. For example, e-mail messages, web page requests and similar digital data that are processed by CPU 218 in accordance with the TCP/IP protocols and sent, via PCI interface 220 to the corresponding one of interface cards 202A–C, such as one of interface cards 202C providing a link via cable modem, digital subscriber line (DSL), or POTS modem to an ISP. Messages and content may be processed using the TCP/IP stack which may be resident in the operating system, and sent via the PCI interface, such as PCI interface 220, to the interface card, for example, one of interface cards 202A–C. CPU 218 processes the data under the control of software in random access memory (RAM) 224. (The software maybe stored in mass storage unit 223 and loaded into RAM 224 as required during execution thereof by CPU 218.) The software may include an operating system (OS) for real time control of CPU 218 and one or more application services. The software may provide functionality for data processing services, such as e-mail, an Internet Relay Chat (IRC) client, web server, and web browser. Other functionality which may be provided include games, home automation or an audio jukebox. These run on the OS, and may use a public applications program interface (API). The aforementioned services are illustrative, and an embodiment providing other such services would be within the spirit and scope of the present invention.

Figure 3:
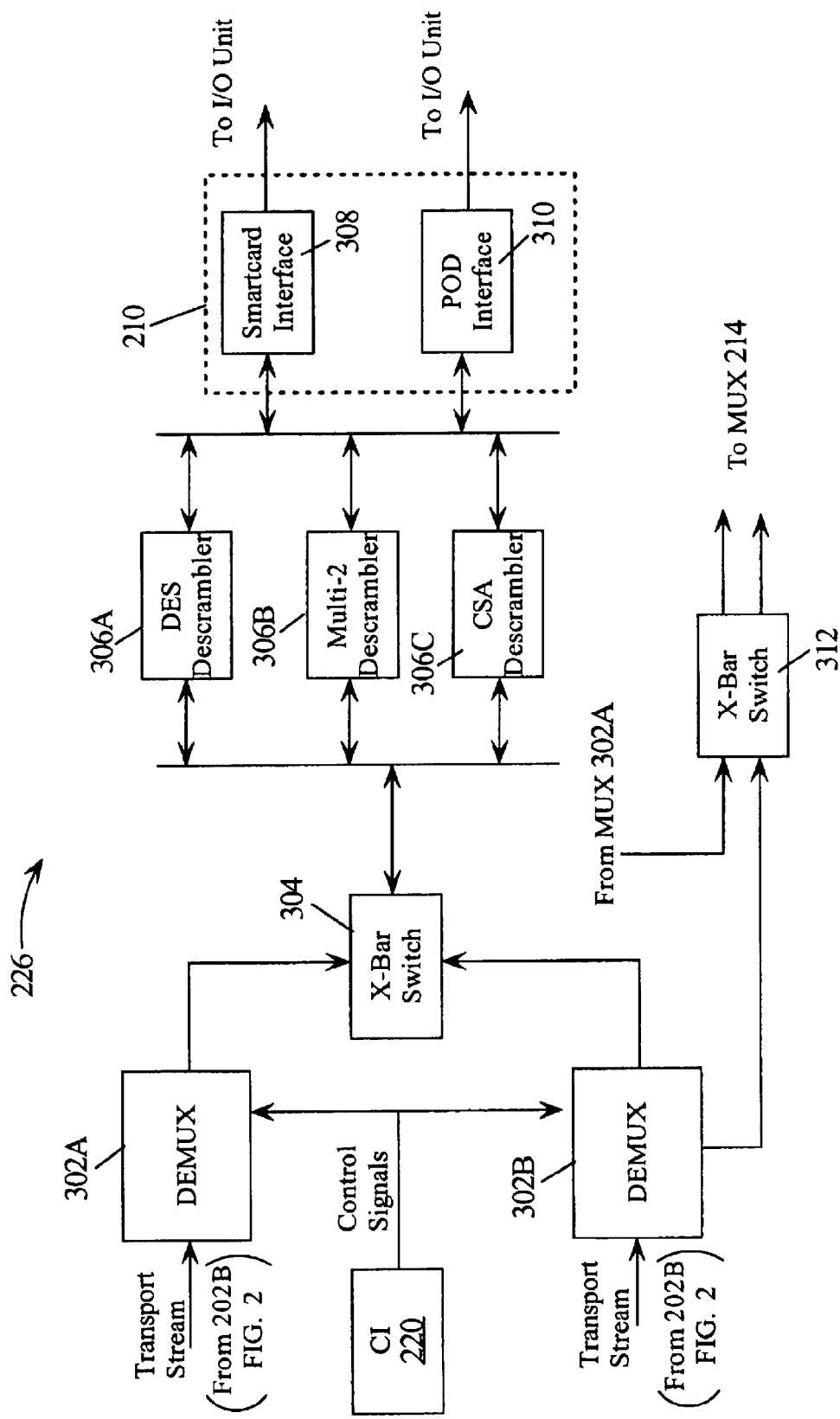
FIG. 3 illustrates, in block diagram form, a portion of the media server apparatus of FIG. 3.

Media server 102 may be further understood by referring to FIG. 3, illustrating a portion 226 (FIG. 2) of media server 102. Portion 226 includes a plurality of demultiplexers (DEMUX), DEMUX 302A and 302B, which receive MPEG Transport Streams from interface card 202B (not shown in FIG. 3). Although two demultiplexers are shown in FIG. 3, it would be understood that portion 226 of media server 102 could include any predetermined number of demultiplexers in accordance with the principles of the present invention. DEMUXs 302A–B demultiplex the transport streams into the constituent PESs. Scrambled PESs, if any, are switched by crossbar (XBAR) switch 304 to a corresponding descrambler, one of descramblers 306A–306C, according to the particular methodology used to scramble the PES. Descrambler 306A descrambles a stream that has been enciphered in accordance with the Data Encryption Standard (DES) algorithm. (The DES is an open private key encryption algorithm that has been adopted as a Federal Information Processing Standard (FIPS), and which has also been adopted by the American National Standards Institute (ANSI) as ANSI X3.92 (referred to in ANSI X3.92 as the Data Encryption Algorithm (DEA).) Descrambler 306A may receive descrambling information, for example, decryption keys required to descramble the data via ISO 7816 smart card interface 308, or Point-of-Deployment (POD) interface 310, according to the particular smart card technology adopted by the users information provider. (ISO 7816 is a smart card technology specification adopted by the International Standards Organization (ISO) and provides standards for the physical, signaling, and command protocols for smart card systems.) POD is a conditional access extension to the PC card standard of the Personal Computer Memory Card Industry Association (PCMCIA).)

Additionally, crossbar switch 304 may route a scrambled PES to Multi-2 descrambler 206B or CSA descrambler 306C, in accordance with the methodology used by the provider to control access. (Multi-2 is a scrambling format adopted in Japan for Communication Satellite (CS) and Broadcast Satellite (BS), and CSA refers to the Common Scrambling Algorithm (CSA) adopted by the Steering Board of the Digital Video Broadcast (DVB) Project. The specifications for the CSA, which are hereby incorporated herein by reference, are distributed by the European Telecommunications Standards Institute.) Control information for the switching of crossbar switch 304 maybe communicated via PCI 220 and bus 222. The descrambled PES is returned through crossbar switch 304 to the corresponding one of DEMUX 302A and 302B and via the corresponding DEMUX to crossbar switch 312. Crossbar switch 312 switches the PES to multiplexer 214 (not shown in FIG. 3). Control information for the switching of crossbar switch 312 may be communicated via PCI 220 and bus 222.

Figure 4:
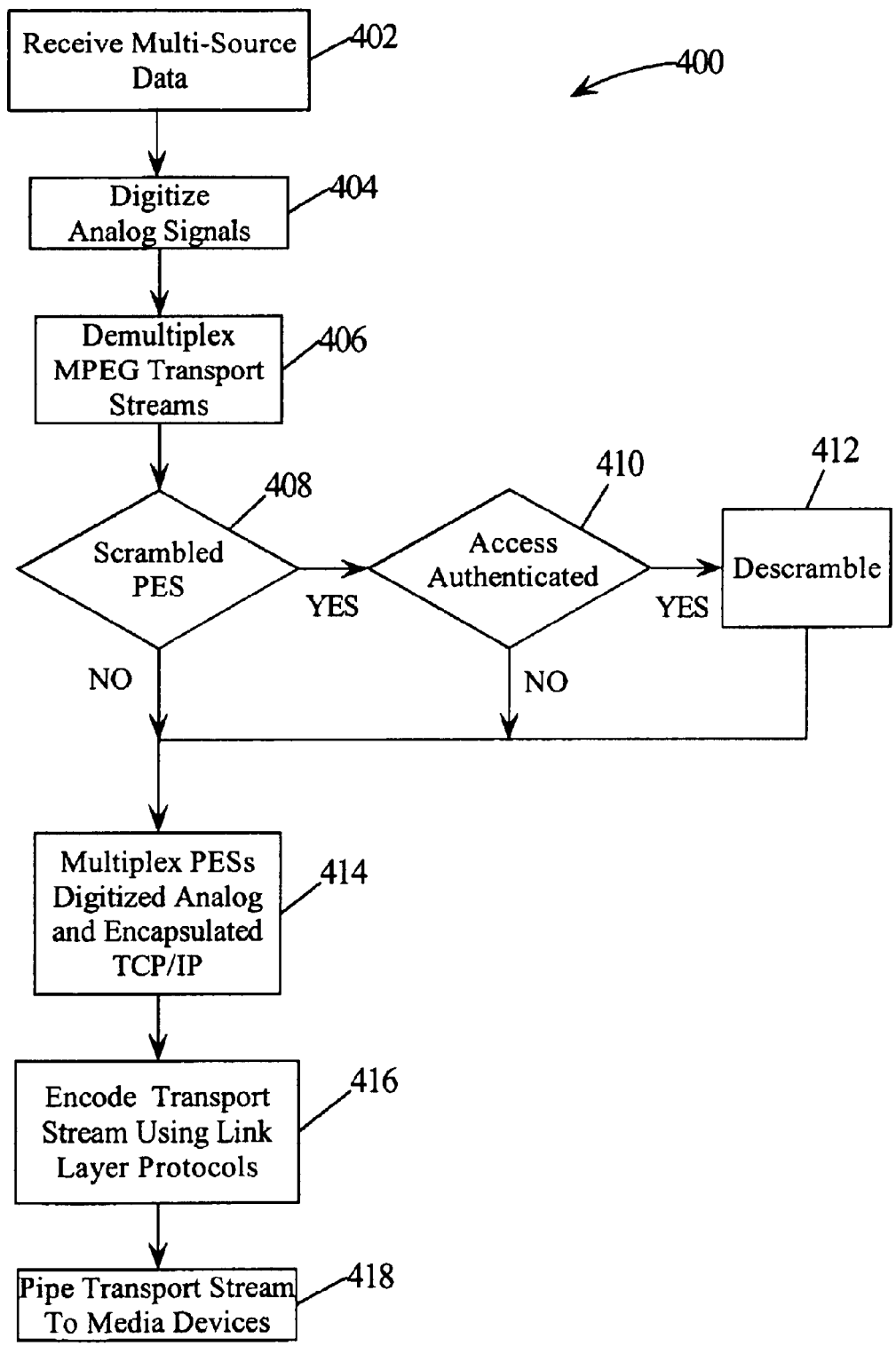
FIG. 4 illustrates, in flow chart form, a methodology for providing integrated media services in accordance with an embodiment of the present invention.

Refer now to FIG. 4 illustrating, in flowchart form, a media server methodology 400 in accordance with the principles of the present invention. In step 402, multi-source data is received. As has been previously described, one or more data sources may be in analog form, such as terrestrial broadcast services, or in digital form from sources on the Internet, or terrestrial HDTV, and satellite broadcasting. As would be understood an by artisan of ordinary skill, the principles of the present invention do not rely on the character of the information providers themselves, or on the particular content of the information and the aforementioned types of data are illustrative. In step 404, signals received in analog form, such as terrestrial analog television broadcasts or terrestrial AM/FM radio broadcasts, are digitized. In step 406, data received in MPEG Transport Streams is demultiplexed. As previously discussed, data communicated in a communication medium, such as direct broadcast satellite, may constitute content derived from a multiplicity of sources. For delivery to the user, the content may be digitally processed, for example by compression in accordance with predetermined standards, such as the MPEG-2 protocols, and then multiplexed into a stream for transport to the user. The elementary streams (PES in an implementation in accordance with MPEG-2) are recovered in step 406. However, one or more elementary streams may be enciphered, or scrambled, to prevent unauthorized access to the content by users who have not, for example, paid for, or otherwise acquired permission, for access.

In step 408, it is determined if one or more packetized elementary streams are scrambled. A scrambled PES may be detected by the presence of CA packets in the stream. If a user has access authenticated, for example by providing, via a smart card, keys needed to descramble the PES, step 410, the enciphered PES is descrambled in step 412 in accordance with the particular scrambling algorithm used by the information provider. Exemplary scrambling technologies which may be used in the present invention have previously been discussed hereinabove in conjunction with FIG. 3.

In step 414, the descrambled PESs, or clear PESs, any digitized analog signals, and TCP/IP domain data encapsulated in accordance with MPEG-2 multi-protocol encapsulation, are multiplexed into an MPEG Transport Stream. The MPEG Transport Stream is encoded in accordance with predetermined link-layer and physical-layer protocols for the particular network architecture being used, for example IEEE-1394, or Fast Ethernet in alternative embodiments of the present invention. (It would be understood by artisans of ordinary skill, that link-layer and physical-layer protocols refer to protocols that support the data-link layer and physical-layer transport in accordance with the Open Systems Interconnection (OSI) seven-layered standard model promulgated by the International Standards Organization (ISO).) In step 418, the encoded transport stream is piped to the media devices connected to the network, for example network 112, FIG. 1.

Although the present invention and its advantages have been described in detail, it should be understood that various changes, substitutions and alterations can be made herein without departing from the spirit and scope of the invention as defined by the appended claims.

What is claimed:

1. A media server apparatus comprising:
   a plurality of demultiplexers each operable for demultiplexing a data stream formatted in accordance with a first predetermined protocol, each demultiplexer outputting a set of elementary streams each having a format in accordance with a second predetermined protocol, and wherein a first one of said plurality of demultiplexers is operable for receiving said data stream from a first source, and a second one of said plurality operable for receiving said data stream from a second source;
   conditional access logic operable for receiving one or more controlled access data streams in said set of elementary streams, said conditional access logic outputting one or more descrambled data streams in response to corresponding ones of said controlled access data streams; and
   a multiplexer coupled to said plurality of demultiplexers, said multiplexer operable for receiving one or more demultiplexed streams from each set of demultiplexed streams and said one or more descrambled data streams and outputs a multiplexed data stream having a format in accordance with a third predetermined protocol.

2. The apparatus of claim 1 wherein said first and second predetermined protocols are the same.

3. The apparatus of claim 1 wherein said first predetermined protocol corresponds to an MPEG-2 specification.

4. The apparatus of claim 1 further comprising a first switch coupled to said plurality of demultiplexers and said conditional access logic, said first switch operable for switching a selected one of said one or more controlled access streams between a corresponding one of said plurality of demultiplexers and said controlled access logic.

5. The apparatus of claim 1 further comprising a central processing unit (CPU) coupled to said plurality of demultiplexers and said multiplexer, said CPU receiving a set of control data from said plurality of demultiplexers and outputting a first control signal, operable for addressing said multiplexed data stream in accordance with a predetermined link layer protocol, to said multiplexer, said first control signal being output in response to said set of control data.

6. The apparatus of claim 1 wherein a predetermined link-layer protocol comprises a link-layer protocol in accordance with a FireWire™ bus specification.

7. The apparatus of claim 1 wherein a predetermined link-layer protocol comprises a link-layer protocol in accordance with a Fast Ethernet bus specification.

8. The apparatus of claim 5 further comprising an interface unit coupling said CPU is coupled and said plurality of demultiplexers, said interface unit being operable for communication said first control signal between said CPU and said plurality of demultiplexers.

9. The apparatus of claim 8 wherein said interface unit is operable for receiving a data stream from a third source, said data stream from said third source having a format in accordance with a fourth predetermined protocol, said interface unit outputting said data stream from said third source to a selected one of said plurality of demultiplexers in response to a second control signal from said CPU.

10. The apparatus of claim 1 further comprising a network encoder operable for receiving said multiplexed data stream and outputting an output data stream encapsulated in accordance with a predetermined data-link-layer protocol.

11. A media server system comprising:
    a plurality of demultiplexers each operable for demultiplexing a data stream formatted in accordance with a first predetermined protocol, each demultiplexer outputting a set of demultiplexed streams each having a format in accordance with a second predetermined protocol, and wherein a first one of said plurality of demultiplexers is operable for receiving said data stream from a first source, and a second one of said plurality of demultiplexers operable for receiving said data stream from a second source;
    first interface circuitry operable for receiving information signals from a plurality of sources and outputting said first and second data streams from said first source and said second source;
    conditional access logic operable for receiving one or more controlled access data streams in said set of demultiplexed streams, said conditional access logic outputting one or more descrambled data streams in response to corresponding ones of said controlled access data streams;
    a multiplexer coupled to said plurality of demultiplexers, said multiplexer operable for receiving one or more demultiplexed stream from each set of demultiplexed streams and said one or more descrambled data streams and outputs a multiplexed data stream having a format in accordance with a third predetermined protocol; and
    a network encoder operable for receiving said multiplexed data stream and outputting an output data stream encapsulated in accordance with a predetermined data-link-layer protocol.

12. The system of claim 11 wherein said first and second predetermined protocols are the same.

13. The system of claim 11 wherein said first protocol corresponds to an MPEG-2 specification.

14. The system of claim 11 further comprising a first switch coupled to said plurality of demultiplexers, and said conditional access logic, said first switch operable for switching a selected one of said one or more controlled access streams between a corresponding one of said plurality of demultiplexers and said controlled access logic.

15. The system of claim 11 further comprising a central processing unit (CPU) coupled to said plurality of demultiplexers and said multiplexer, said CPU receiving a set of control data from said plurality of demultiplexers and outputting a first control signal, operable for addressing said multiplexed data stream in accordance with said predetermined link layer protocol, to said multiplexer, said first control signal being output in response to said set of control data.

16. The system of claim 11 wherein said predetermined link-layer protocol comprises a link-layer protocol in accordance with a FireWire™ bus specification.

17. The system of claim 11 wherein said predetermined link-layer protocol comprises a link-layer protocol in accordance with a Fast Ethernet bus specification.

18. The system of claim 15 further comprising an interface unit coupling said CPU is coupled and said plurality of demultiplexers, said interface unit being operable for communication said first control signal between said CPU and said plurality of demultiplexers.

19. The system of claim 18 wherein said interface unit is operable for receiving a data stream from a third source, said data stream from said third source having a format in accordance with a fourth predetermined protocol, said interface unit outputting said data stream from said third source to a selected one of said plurality of demultiplexers in response to a second control signal from said CPU.

20. The system of claim 11 further comprising a controlled access input/output (I/O) device operable for receiving a controlled access user token; said controlled access I/O device operable for receiving access control information from said controlled access logic and outputting authentication information to said controlled access logic in response to thereto.

21. A media server method comprising the steps of:
   receiving a plurality of media streams, one or more of said media streams comprises multiplexed data;
   demultiplexing said one or more of said media streams comprising multiplexed data to form a plurality of elementary streams;
   descrambling a first one of said plurality of elementary streams in response to controlled access information in said first one of said plurality of elementary streams, to form a descrambled stream; and
   multiplexing said descrambled stream and remaining ones of said elementary stream to form a transport stream.

22. The method of claim 21 further comprising the step of sending said transport stream to one or more networked user presentation devices.

23. The method of claim 21 wherein a first one of said media streams is encoded in accordance with a first predetermined protocol and a second one of said plurality of media streams is encoded in accordance with a second predetermined protocol.

24. The method of claim 23 further comprising the step of multiplexing said second one of said plurality of media streams in said transport stream.

25. The method of claim 24 wherein said second one of said plurality of media streams is multiplexed in said transport stream by encapsulating said second predetermined protocol in accordance with said first predetermined protocol.

26. The method of claim 21 further comprising the step of encoding said transport stream in accordance with a predetermined link-layer protocol.

* * * * *